US010771767B2

United States Patent
Grunnet-Jepsen et al.

(10) Patent No.: US 10,771,767 B2
(45) Date of Patent: Sep. 8, 2020

(54) PROJECTOR FOR ACTIVE STEREO DEPTH SENSORS

(71) Applicant: Intel Corporation, Santa Clara, CA (US)

(72) Inventors: Anders Grunnet-Jepsen, San Jose, CA (US); Akihiro Takagi, San Mateo, CA (US); John N. Sweetser, Sunnyvale, CA (US); Paul Winer, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/289,130

(22) Filed: Feb. 28, 2019

(65) Prior Publication Data

US 2019/0200001 A1 Jun. 27, 2019

(51) Int. Cl.
*H04N 13/254* (2018.01)
*H04N 13/296* (2018.01)
*H04N 13/239* (2018.01)
*G03B 35/06* (2006.01)

(52) U.S. Cl.
CPC ......... *H04N 13/254* (2018.05); *G03B 35/06* (2013.01); *H04N 13/239* (2018.05); *H04N 13/296* (2018.05)

(58) Field of Classification Search
CPC .. H04N 13/254; H04N 13/239; H04N 13/296; G03B 35/06
USPC ......................................................... 348/47
See application file for complete search history.

(56) References Cited

U.S. PATENT DOCUMENTS

| 5,424,872 A * | 6/1995 | Lecuyer | G02B 27/644 359/556 |
| 6,260,991 B1 * | 7/2001 | Hulse | B60Q 1/0011 362/300 |
| 9,124,877 B1 * | 9/2015 | Riederer | H04N 13/246 |
| 2005/0029464 A1 * | 2/2005 | Babayoff | G02B 21/0056 250/370.08 |
| 2014/0185052 A1 * | 7/2014 | Chen | G01J 3/0237 356/453 |
| 2014/0237884 A1 * | 8/2014 | Koesler | F41G 1/30 42/119 |
| 2015/0165550 A1 * | 6/2015 | Fry | B23K 26/032 219/121.68 |
| 2016/0116730 A1 * | 4/2016 | McCreight, Jr. | G02B 23/12 359/354 |
| 2016/0241758 A1 * | 8/2016 | Dohi | H04N 5/2256 |

(Continued)

OTHER PUBLICATIONS

Naganuma, et al., "High-resolution KTN Optical Beam Scanner", NTT Technical Review; retrieved online via www.ntt-review.jp/archive/ntttechnical.php?contents=ntr200912sf4.html on Feb. 28, 2019.

(Continued)

*Primary Examiner* — Zaihan Jiang
(74) *Attorney, Agent, or Firm* — Green, Howard & Mughal LLP.

(57) ABSTRACT

Systems, devices, and techniques related to projecting dynamic feature patterns onto a scene for use in stereoscopic imaging are discussed. Such techniques may include implementing a dynamic transmissive element in an optical path between a projector and the scene to modify a static pattern emitted from the projector to illuminate the scene with a dynamic pattern.

20 Claims, 9 Drawing Sheets

(56) References Cited

U.S. PATENT DOCUMENTS

2016/0327779 A1* 11/2016 Hillman ................ G02B 23/04
2017/0038571 A1*  2/2017 Daugela ............. G02B 27/0025
2017/0322493 A1* 11/2017 Sun ....................... G02B 17/08
2019/0072897 A1*  3/2019 Jepsen ................. G03H 1/0456

OTHER PUBLICATIONS

Romer, et al., "Electro-optic and acousto-optic laser beam scanners", 8th International Conference on Photonic Technologies; Physics Procedia 56 (2014): 29-39.

* cited by examiner

PROJECTOR FOR ACTIVE STEREO DEPTH SENSORS

BACKGROUND

In computer vision and other imaging and computing contexts, depth images are generated based on two (e.g., left and right or reference and target) captured images of a scene. In particular, in a stereo-depth camera, depth is determined primarily from solving the correspondence problem between left and right images of a scene, determining the disparity for each pixel (i.e., a shift between object points in the left and right images), and calculating the depth map from disparity using triangulation techniques.

In active stereo vision, an infrared (IR) pattern is projected onto a scene such that the images obtained during exposure include the IR pattern as modified by the scene. Such techniques may be advantageous when the scene itself does not include a lot of texture (e.g., for blank white walls or similar scene elements). The obtained images including the IR texture are then used to generate a depth image using stereoscopic image matching techniques based in part on the features of the modified IR pattern. Such depth image(s) are used in a wide variety of computer vision and image processing contexts.

Current IR patterns and projectors have shortcomings with respect to the resultant stereoscopic matching and depth image results. It is with respect to these and other considerations that the present improvements have been needed. Such improvements may become critical as the desire to utilize depth images in a variety of applications becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
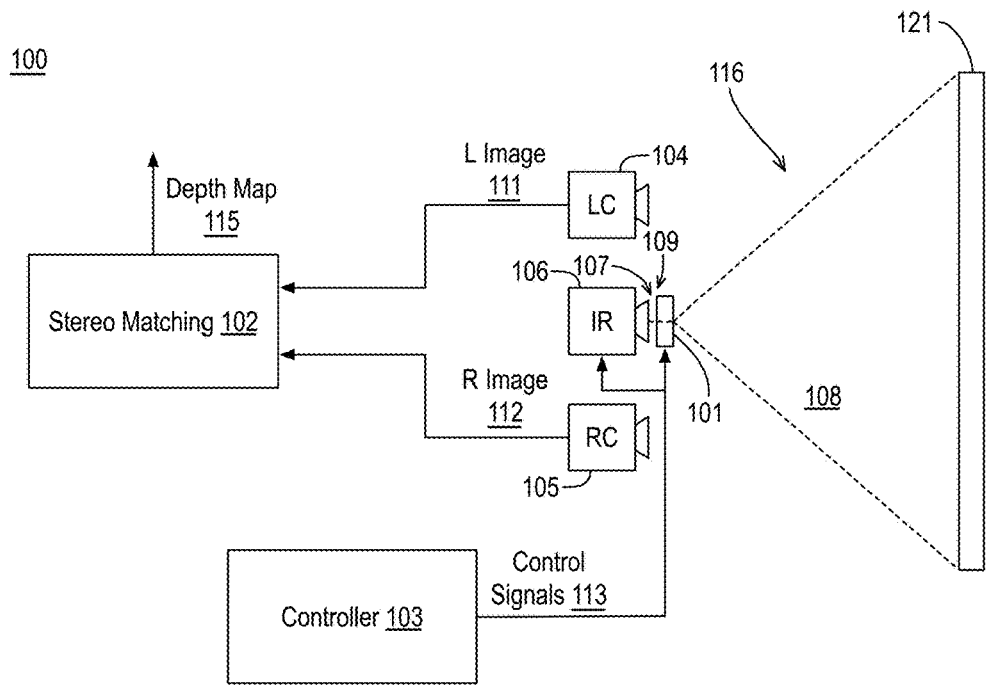
FIG. 1 is a diagram of components of an example system for providing active stereo vision.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", or such embodiments, or examples, etc., indicate that the implementation, embodiment, or example described may include a particular feature, structure, or characteristic, but every implementation, embodiment, or example may not necessarily include the particular feature, structure, or characteristic. Moreover, such phrases are not necessarily referring to the same implementation. Furthermore, when a particular feature, structure, or characteristic is described in connection with an embodiment, it is submitted that it is within the knowledge of one skilled in the art to affect such feature, structure, or characteristic in connection with other implementations whether or not explicitly described herein. The terms "substantially," "close," "approximately," "near," and "about," generally refer to being within +/−1% of a target value.

Methods, devices, apparatuses, computing platforms, and articles are described herein related to projection of a temporally variant pattern onto a scene for active stereoscopy.

As described above, in some contexts, depth images are generated using two (e.g., left and right or reference and target) two-dimensional color images of a scene such that an infrared (IR) pattern, visible light pattern, or both an IR and visible light pattern has been projected onto the scene during image capture. Such a pattern (e.g., a texture pattern) provides pattern residuals in the captured image such that the pattern is captured during image capture. The resultant captured images including the pattern improve stereoscopic image matching, particularly when the scene would not otherwise contain texture details for the matching. In embodiments discussed herein, a dynamic transmissive element such as a moveable lens, a solid state beam deflector, or a liquid crystal display (LCD) device is provided within an optical path between an IR projector and a scene to be illuminated by the pattern. The dynamic transmissive element either between image capture, during image capture, or both provides for movement of features (e.g., dots) of the pattern emitted from the projector. Such feature movement provides improved stereo matching in the context of a single instance of image capture or in the context of multiple image captures over time.

Thereby, the projector and dynamic transmissive element collectively provide for a high quality projection system that, among other attributes, is small and optically efficient to reduce power consumption and improve product integration, has a dense semi-random pattern, has high contrast, is dynamic such that residual depth to pattern dependencies in the stereo algorithm are averaged out, has little or no speckle, has programmable dot density, has the ability to redistribute power, provides grey scale, and has a texture that is scale invariant such that the pattern reveals structures at different ranges within a scene.

FIG. 1 is a diagram of components of an example system 100 for providing active stereo vision, arranged in accordance with at least some implementations of the present disclosure. As shown in FIG. 1, system 100 includes a stereo matching module 102, a controller 103 (e.g., a dynamic transmissive IR element controller), a left camera 104, a right camera 105, an IR projector 106, and a dynamic transmissive IR element 101. System 100 may also include a memory, a display, a computer vision module, etc. Also as shown, IR projector 106 projects an IR pattern 107 (the details of which are discussed below) toward a scene 121. As used herein, the term IR pattern indicates any pattern of IR features to be spatially projected. A static IR pattern indicates the IR pattern does not vary over time. Dynamic transmissive IR element 101 is in an IR path 109 between IR projector 106 and scene 121. As used herein, the term IR path indicates a path containing IR radiation emitted from IR projector 106 prior to the IR radiation illuminating scene 121. In some embodiments, IR path 109 is a direct IR path between IR projector 106 and scene 121 such that no other active elements (e.g., elements capable of varying the temporal nature of the IR radiation) operate on the IR radiation between IR projector 106 and scene 121. In some embodiments, IR path 109 is a direct linear IR path between IR projector 106 and scene 121 such that no other active elements operate on the IR radiation between IR projector 106 and scene 121 and such that dynamic transmissive IR element 101 is along a line between IR projector 106 and scene 121.

Although discussed herein with respect to IR projector 106, IR radiation, IR pattern 107, and so on, such that the discussed illumination has a wavelength longer than those of visible light (i.e., IR radiation) for the sake of clarity of presentation, in some embodiments the radiation may be visible radiation or a combination of visible light and IR radiation. Therefore, the terms projector, pattern, lens, etc. refer to those components either generating, including, operating on, etc. IR radiation or visible light or a combination of IR radiation and visible light, whereas when those terms are preceded by or otherwise modified by the term IR, they refer to those components generating, including, operating on, etc. IR radiation only. As used herein, the term IR refers to any radiation having wavelength(s) longer than those of visible light. For example, a projector may produce either IR radiation or visible light or both while an IR projector produces only IR radiation. Furthermore, the term optical path or optical in general is not limited to visible light and may be a path for IR radiation, visible light, or both, whereas the term IR path is a path for IR radiation.

As indicated above, the term IR is typically used herein for the sake of clarity and for discussion of some embodiments and applications, but it is not meant to be limiting. For example, elements discussed with respect to IR are not limited to IR and may instead be implemented using visible light or a combination of visible light and IR. Notably, IR may be preferred in contexts when visible light would be distracting to humans while other applications such as enclosed spaces, automation, robotics application, etc. may allow for visible light based projection.

Dynamic transmissive IR element 101, under the control of controller 103 via control signals 113, temporally modifies IR pattern 107 to generate a temporally modified IR pattern 108. In an embodiment, IR pattern 107 is a static IR pattern such that, if illuminated onto scene 121 without temporal adjustment via dynamic transmissive IR element 101, no change in the pattern projected onto scene 121 over time would be made (although, of course, scene 121 could change). IR projector 106 may be any suitable IR projector such as a vertical-cavity surface-emitting laser (VCSEL) based projector that uses a lens to re-project thousands (for example) of vertical emitting lasers arrayed onto a chip, a single laser transmitted through a diffractive element), etc. Furthermore, IR pattern 107 may be any suitable IR pattern having any suitable features such as dots and lines and patterns thereof. As discussed further herein, IR pattern 107 is temporally adjusted via dynamic transmissive IR element 101 to generate temporally modified IR pattern 108 for improved stereoscopic matching.

Left camera 104 and right camera 105 may be any suitable camera or camera array modules each including, for example, an image sensor that conveys the data or information of an image by converting light into signals or signal values. As shown, left camera 104 and right camera 105 generate left image 111 and right image 112, respectively. For example, left and right cameras 104 may be RGB cameras, cameras outputting in other color spaces, monochrome cameras, black and white cameras, IR cameras, etc. Left image 111 and right image 112 are attained substantially simultaneously to provide left and right views of scene 121. Left image 111 and right image 112 are provided to stereo matching module 102, which uses left image 111 and right image 112 to generate a depth map 115 (or disparity map) based on stereo vision techniques.

System 100 or any combination of components thereof may be implemented via any suitable device such as a depth sensor, a depth sensor module, or the like. Although discussed herein with respect to implementation via a depth sensor module, system 100 may be implemented in any other suitable imaging device such as a personal computer, a laptop computer, a tablet, a phablet, a smart phone, a digital camera, a gaming console, a wearable device, a set top device, or the like.

Figure 2:
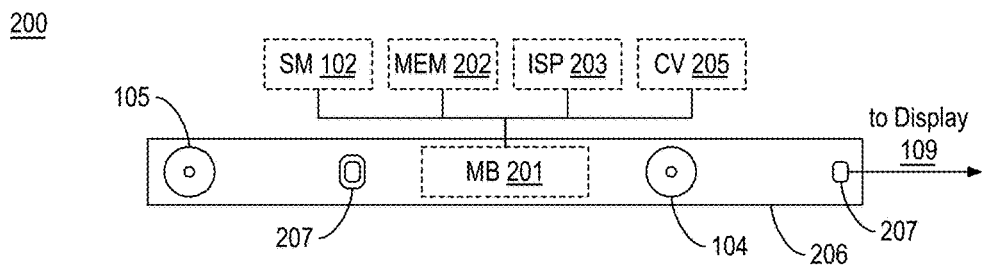
FIG. 2 illustrates an example device for providing active stereo vision.

FIG. 2 illustrates an example device 200 for providing active stereo vision, arranged in accordance with at least some implementations of the present disclosure. As shown in FIG. 2, device 200 includes left camera 104, right camera 105, an IR projection system 207 (i.e., including IR projector 106 and any dynamic transmissive IR element 101 discussed herein), and a motherboard 201 to implement, within a housing 206 of device 200, stereo matching module 102, a memory 202, an image signal processor (ISP) 203, and a computer vision module 205. Also as shown, device 200 may include a display port 207 to transmit image data for presentment to a user via display 109, which may be implemented as an integrated component of device 200 or separately from device 200.

With reference to FIGS. 1 and 2, stereo matching module 102 generates depth map 115 or a disparity map using left image 111 and right image 112, which include temporally modified IR pattern 108 as modified by scene 121. Left image 111 and right image 112 include an IR texture or pattern and may include red-green-blue (RGB) image data, YUV image data, YCbCR image data, black and white image data, luma only image data, monochrome image data, etc. Stereo matching module 102 may generate depth map 115 based on a search of a target image (i.e., right image 112) based on a window generated around a pixel location in a reference (i.e., left image 111) image and, optionally, other techniques such as temporal tracking, etc. In some embodiments, left camera 104 and right camera 105 are substantially horizontally aligned with respect to scene 121.

Figure 3:
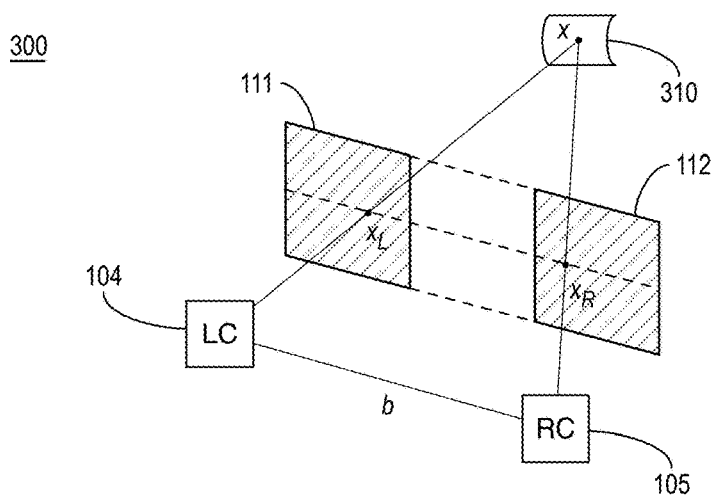
FIG. 3 illustrates an example stereoscopic image matching.

FIG. 3 illustrates an example stereoscopic image matching 300, arranged in accordance with at least some implementations of the present disclosure. As shown in FIG. 3, stereoscopic image matching 300 may include attaining left image 111 and right image 112 of scene 121, which may include an example surface 310. Stereo matching techniques determine a depth for disparity image based on triangulating correspondences. For example, as shown in FIG. 3, given left and right images 111, 112, each including a representation of three-dimensional point x on surface 310, the depth, d, of x, may be determined based on d=f*b/disp, where f and b are the focal length and base line, respectively, and disp, is the disparity for x, indicating the pixel displacement of x left and right images 111, 112 (e.g., $x_L-x_R$, where $x_L$ and $x_R$ are the projections of x onto left and right images with IR features, respectively). To determine the disparity, a rectangular template or window may be formed around $x_L$ in left image 111 and horizontal search windows in right image 112 are searched horizontally for the best match (or vice versa). Such processing is repeated for all or some pixels of left and right images 111, 112 to generate depth map 115.

Referring again to FIG. 1, during the illumination of temporally modified IR pattern 108 onto scene 121, left camera 104 and right camera 105 attain left image 111 and right image 112. As discussed, it is advantageous to temporally modify IR pattern 107 as emitted by IR projector 106 using dynamic transmissive IR element 101. Dynamic transmissive IR element 101 may include any suitable element that may temporally modify IR pattern 107 such as an IR lens having a wedge portion, an IR lens having multiple wedge portions and/or planar portions, a solid state beam deflector, a liquid crystal display device, an elastomer, or an array of 2D mirrors.

Figure 4:
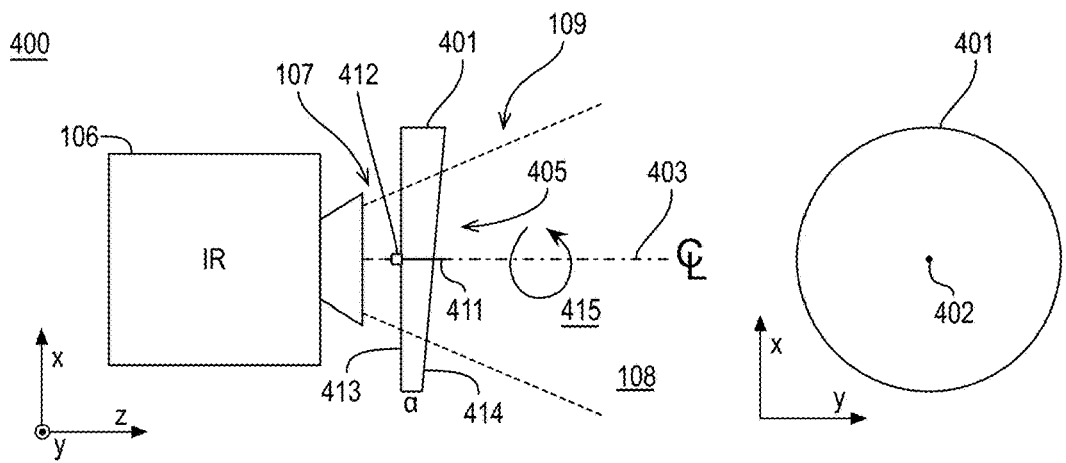
FIG. 4 is a diagram of an example IR projection system for use in active stereo vision.

FIG. 4 is a diagram of an example IR projection system 400 for use in active stereo vision, arranged in accordance with at least some implementations of the present disclosure. As shown in FIG. 4, IR projection system 400 includes IR projector 106 and an IR lens 401. As used herein, the term IR lens indicates a lens transmissive to IR radiation that may include one or more shaped portions or regions to manipulate features of IR pattern 107. Notably, as discussed, IR pattern 107 from IR projector 106 may be a static pattern without use of a dynamic transmissive IR element 101 as discussed herein.

Figure 5:
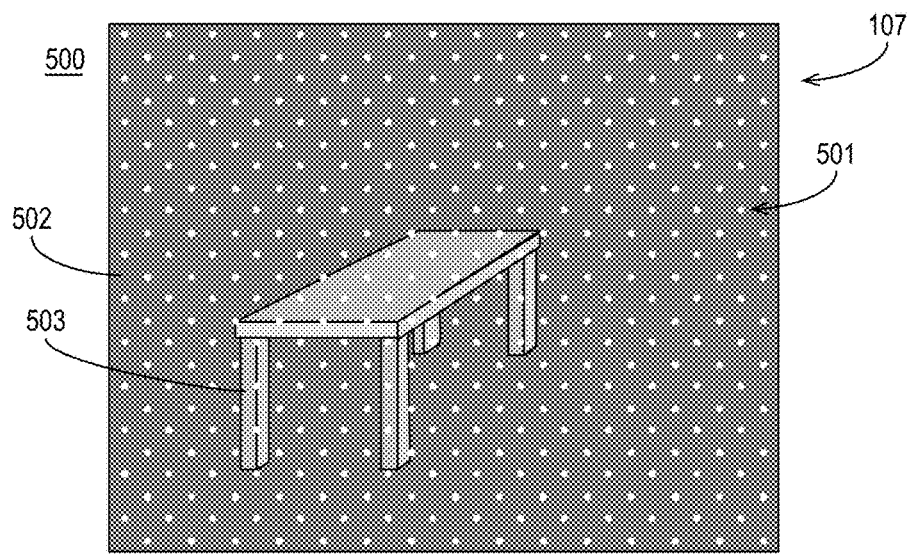
FIG. 5 illustrates a depiction of an example image with a static IR pattern.

FIG. 5 illustrates a depiction of an example image 500 with a static IR pattern, arranged in accordance with at least some implementations of the present disclosure. For example, image 500 illustrates an example image that may be attained by applying IR pattern 107 onto a scene. Although illustrated with respect to a repetitive grid like IR pattern of IR features 501 that are dots for the sake of clarity of presentation, as discussed, IR pattern 107 may be any suitable pattern of IR features 501. As shown in FIG. 5, image 500 includes IR features 501 (i.e., white dots in the illustration) from IR pattern 107 being projected on scene 121. Scene 121 may include any suitable scene. In the illustrated embodiment, scene 121 includes a foreground object 503 (e.g., a table) and a background 502. For example, IR pattern 107 may include thousands of IR dots or other IR features.

Figure 6:
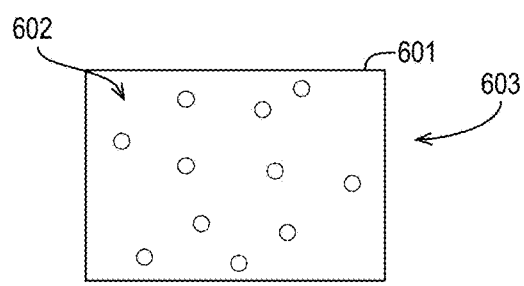
FIG. 6 illustrates a depiction of an example image portion with a static IR pattern.

FIG. 6 illustrates a depiction of an example image portion 601 with a static IR pattern 603, arranged in accordance with at least some implementations of the present disclosure. As with FIG. 5, image portion 601 includes (static) IR pattern 603. FIG. 6 illustrates that IR pattern 603 may deviate from a repetitive pattern and may include IR features 602 that are spatially sporadic or scattered across image portion 601. IR pattern 107 emitted from IR projector 106 may include repetitive patterns, sporadic portions, or both as well as IR dots (as illustrated), IR line segments, or other static IR patterns, which are termed features or IR features herein. In the following illustrations, static IR pattern 603 is used as a baseline for the discussion of exemplary temporally modified IR patterns 108 for the sake of clarity of presentation.

Returning to FIG. 4, IR projection system 400 includes IR projector 106 and IR lens 401. IR lens 401 includes a wedge portion 405 and IR lens 401 is moveably mounted such that wedge portion 405 is moveable within IR path 109. As used herein, the term wedge portion indicates a portion of a lens or an entirety of the lens having a wedge shape with one surface having an angle with respect to the opposite surface. The opposing surfaces may both be flat or slightly curved. The wedge angle therebetween may be any suitable angle that provides non-planarity between the opposing surfaces and deflection of IR pattern elements as discussed herein. In the example of FIG. 4, IR lens 401 is a disc and wedge portion 405 extends across an entirety of disc from one edge to an opposite edge thereof. For example, IR lens 401 may be a uniform wedge prism. However, IR lens may have any cross-sectional shape (e.g., square, oval, etc.) instead of circular and wedge portion 405 may extend across only a portion thereof. As shown, wedge portion 405 of IR lens 401 has first flat surface 413 and a second flat surface 414 opposite first flat surface 413 such that there is a wedge angle therebetween. IR lens 401 may include any material or materials transmissive of the IR radiation of IR pattern 107 such as glass, plastic, etc. Although illustrated and discussed with respect to first flat surface 413 and second flat surface 414, in some embodiments, surface 414 is curved as discussed herein with respect to wedge portion 1005 of FIG. 10.

Figure 7:
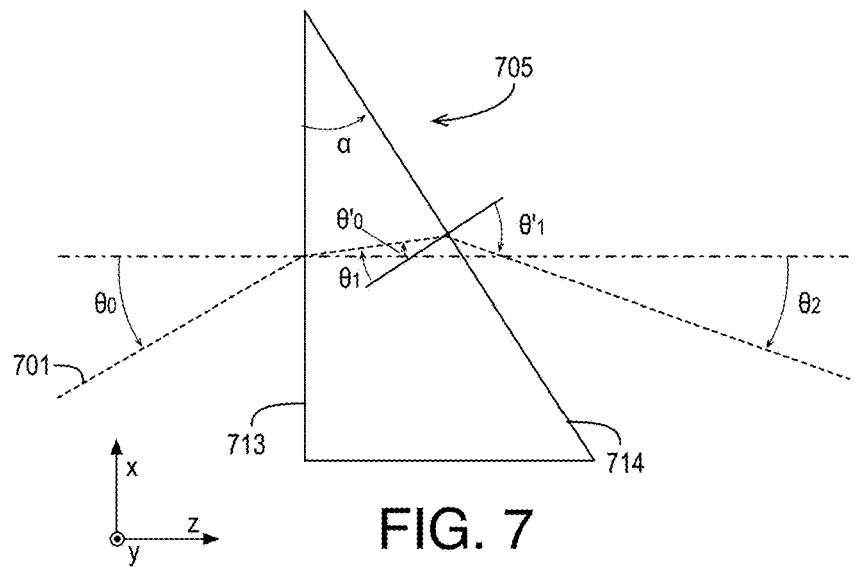
FIG. 7 illustrates exemplary radiation shifts for an exemplary lens wedge portion or prism.

FIG. 7 illustrates exemplary radiation shifts for an exemplary lens wedge portion or prism, arranged in accordance with at least some implementations of the present disclosure. As shown in FIG. 7, for a wedge angle, α, of a wedge portion 705 having a first flat surface 713 orthogonal to a z-direction (e.g., toward a scene) and a second flat surface 714 offset with respect to the z-direction in analogy to other wedge portions discussed herein such as wedge portion 405, a particular IR feature 701 will be shifted by wedge portion 705 (e.g., an IR lens wedge or optical wedge) according to Snell's law as provided by Equation (1):

$$\delta \approx \theta_0 - \alpha + \left(n\left[\alpha - \frac{1}{n}\theta_0\right]\right) = \theta_0 - \alpha + n\alpha - \theta_0 = (n-1)\alpha \quad (1)$$

where δ is the deflection angle of IR feature 701, $\theta_0$ is the incoming radiation angle with respect to normal, n is the index of refraction, and α is the wedge angle as shown in FIG. 7. For a glass prism in air, n is about 1.5 such that the deflection angle, δ, is about half of the wedge angle, α.

Returning to FIG. 4, in the embodiment of FIG. 4, wedge portion 405 extends across an entirety of IR path 109 such that the entirety of IR path 109 is effected by wedge portion 405. In other embodiments, only a portion of IR path 109 may be intersected by wedge portion 405. As shown, when IR projector 106 is directed toward a scene in the z-direction such that a center of IR pattern 107 is along a centerline 403 aligned with the z-direction, first flat surface 413 is substantially orthogonal to the z-direction and first flat surface 413 is parallel with respect to an x-y plane while second flat surface 414 is offset with respect to the x-y plane by the wedge angle, α. In an embodiment, the wedge angle, α, is not less than 0.1 degrees. In an embodiment, the wedge angle, α, is not less than 0.2 degrees. In an embodiment, the wedge angle, α, is not less than 0.25 degrees. In an embodiment, the wedge angle, α, is not less than 0.5 degrees. In an embodiment, the wedge angle, α, is not less than 1 degree. In an embodiment, the wedge angle, α, is not less than 2 degrees. In some embodiments, the wedge angle, α, is about 0.5 degrees, 1 degree, or 2 degrees. Any wedge portion discussed may have such wedge angle characteristics. In the illustrated embodiment, the flat surface aligned with the x-y plane is proximal to IR projector 106. In other embodiments, the flat surface aligned with the x-y plane is opposite IR projector 106. Notably, centerline 403 is along a centerline of IR pattern 107, IR projector 106, and scene 121.

As shown, in an embodiment, IR lens 401 is mounted to an axis 411 that is substantially along centerline 403 and is controlled via a motor 412 to rotate in a rotational direction 415 about axis 411. For example, controller 103 (please refer to FIG. 1) may provide a signal to motor 412 to rotate IR lens 401. Notably, axis 411 may be mounted to and/or extend through a center point 402 of IR lens 401. As shown, the faces (i.e., first flat surface 413 and second flat surface 414) of wedge portion 405 of IR lens are slightly tilted with respect to each other such that the thickness of wedge portion 405 varies linearly in one dimension (e.g., a dimension in the x-y plane) and wedge portion 405 is rotated about axis 411. The illustrated arrangement provides, for IR features in temporally modified IR pattern 108, the feature (e.g., an IR spot) projected through wedge portion 405 to trace a circular path in temporally modified IR pattern such that the circular path has a radius that is about half the wedge angle, α. For example, rotation of IR lens 401 during image capture exposure via left camera 104 and right camera 105 provides for IR features of IR pattern 107 to trace a circular path (e.g., an arc or portion of a circle or an entire circle depending on rotation speed and image capture duration) to aid in eventual stereoscopic matching. It is noted that herein, image capture refers to the capture of two (e.g., left and right) or more images simultaneously for the sake of stereoscopic computer vision. Similarly, video capture refers to the simultaneous capture of two or more video images at each time instance.

Figure 8:
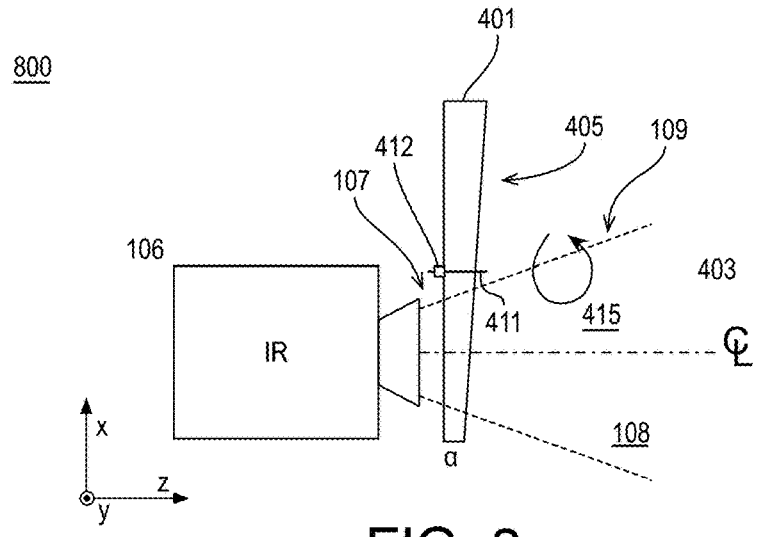
FIG. 8 is a diagram of an example IR projection system with a wedge portion off axis with respect to a centerline of an IR pattern.

FIG. 8 is a diagram of an example IR projection system 800 with a wedge portion off axis with respect to a centerline of an IR pattern, arranged in accordance with at least some implementations of the present disclosure. As shown in FIG. 8, IR projection system 800 is similar IR projection system 400 with the exception that axis 411 is offset with respect to center line 403 of IR pattern 107. In the illustrated embodiment, axis 411 is outside of IR path 109. In other embodiments, axis 411 is within IR path 109 and offset with respect to center line 403. Axis 411 may be offset with respect to center line 403 in the x-direction, the y-direction, or both. Notably, an offset of axis 411 with respect to center line 403 may cause a wobble or other discontinuity in the path traced by an IR feature in temporally modified IR pattern 108 during image capture.

Figure 9:
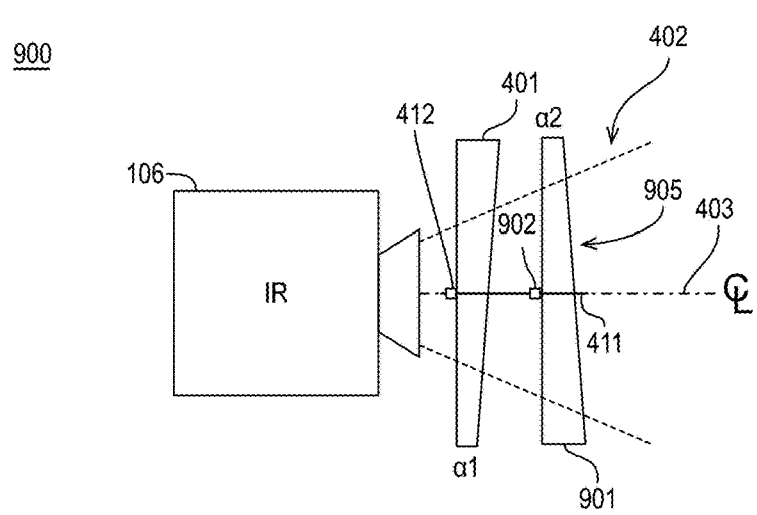
FIG. 9 is a diagram of an example IR projection system with multiple wedge portions across the IR pattern.

FIG. 9 is a diagram of an example IR projection system 900 with multiple wedge portions across the IR pattern, arranged in accordance with at least some implementations of the present disclosure. As shown in FIG. 9, IR projection system 900 is similar to IR projection system 400 with the exception that IR projection system 900 includes a second IR lens 901 having a second wedge portion 905 mounted to axis 411 and having a second motor 902 for control, independent of motor 412, thereof. Second IR lens 901 and second wedge portion 905 may have any characteristics, orientations, etc. as discussed with respect to IR lens 401 and wedge portion 405. As shown, in an embodiment, IR lens 401 and second IR lens 901 are independently controllable via motors 412, 902, respectively. For example, controller 103 may provide signals to independently control motors 412, 902. Notably, use of two or more wedge portions 405, 905 having independently controlled rotation rates provides for any arbitrary pattern within a predefined radius according to the wedge angles α1 and α2 of wedge portions 405, 905, respectively. For example, the rotation of two or more wedge portions 405, 905 may be controlled in any manner to produce a variety of patterns during image capture via left and right cameras 104, 105. The wedge angles α1 and α2 of wedge portions 405, 905 may be the same (e.g., α1=α2) or they may be different.

Figure 10:
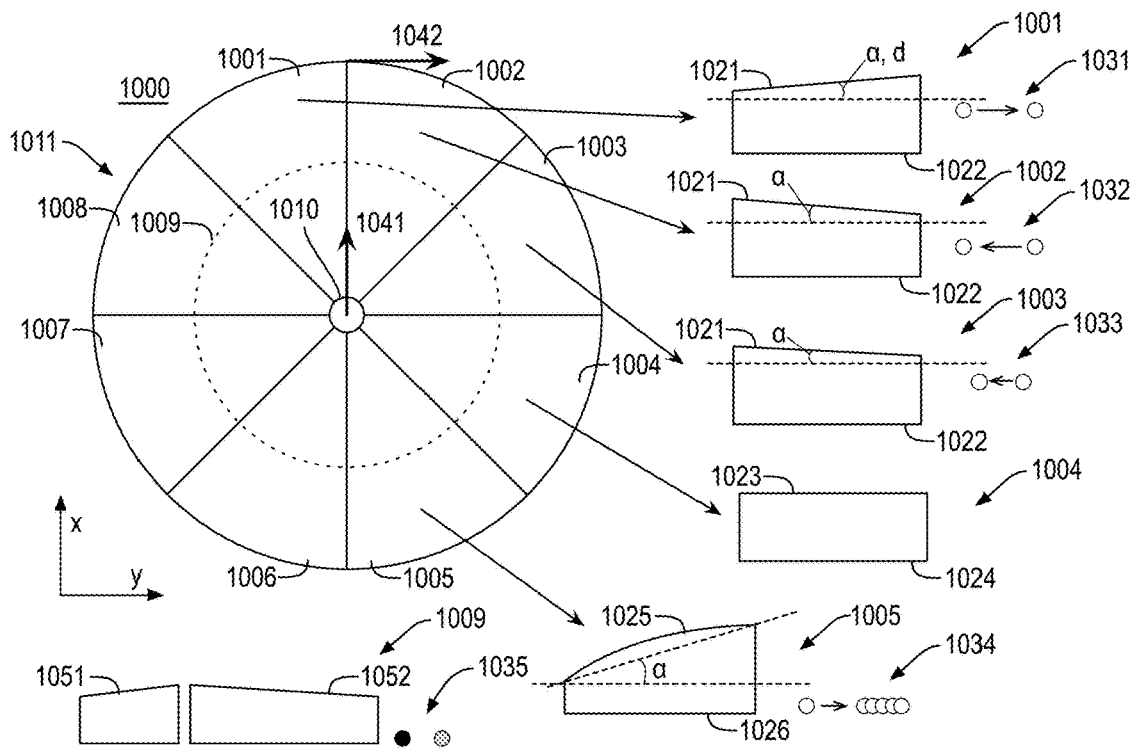
FIG. 10 is a diagram of an example IR lens having sections with differing characteristics.

FIG. 10 is a diagram of an example IR lens 1000 having sections with differing characteristics, arranged in accordance with at least some implementations of the present disclosure. As shown in FIG. 10, IR lens 1000 includes sections 1001-1008 that may each have differing characteristics. In some embodiments, IR lens 1000 may be implemented in IR projection system 800 in place of IR lens 401 such that IR path 109 fits within one of sections of IR lens 1000. For example, at a particular time instance, only one of sections 1001-1008 may be within IR path 109. In other embodiments, IR lens 1000 may be implemented in place of IR lens 401 in IR projection system 400 or in place of one or both of IR lens 401 and IR lens 901 in IR projection system 900. Notably, IR lens 1000, as implemented via an optical disc provides for different effects in IR features of temporally modified IR pattern 108. For example, each of sections 1001-1008 may have a different wedge angle or gradation from one angle to another. In implementation, the rotation speed of IR lens 1000 is adjusted to be faster than the optical exposure and frame rate, or slower, resulting in different behavior during exposure as discussed further herein.

In the illustrated embodiment, IR lens 1000 is divided into eight sections 1001-1008. However, IR lens 1000 may include any number of sections such as two, three, four, more than eight, etc. Furthermore, in the illustrated embodiment, each of sections 1001-1008 extends from a center 1010 of IR lens 1000 to or toward an outer edge 1011 of IR lens 1011. In other embodiments, IR lens 1000 has multiple sections between center 1010 and outer edge 1011 as illustrated with respect to division circle 1010. In IR lens 1000, each section boundary indicates sections of IR lens have differing characteristics. However, it is noted that some section types may be repeated within IR lens 1000.

Each of sections 1001-1008 may have any suitable characteristics in any combination, as discussed in particular with respect to example sections 1001-1005. Notably, the sections may be placed in any order and may include any characteristics such that at least one characteristic differs with respect to the neighboring sections. For example, a section may have one or more characteristics that differ with respect to its neighboring sections. In an embodiment, a characteristic of sections 1001-1008 that may differ is the material of the section itself. For example, the material choice between sections may vary the indices of refraction thereof. In an embodiment, one or more of sections 1001-1008 are glass, fused quartz, polycarbonate, or sapphire in any combination.

As shown with respect to sections 1001-1003, in some embodiments, one or more sections include wedge portions of differing wedge angles, α, and/or directions, d, thereof. For example, one or more of sections 1001-1008 may be wedge portions having a flat top surface 1021 and a flat bottom surface 1022 (opposite flat top surface 1021) and a wedge angle, α, therebetween, which may be any wedge angle discussed herein. The terms top and bottom are used for convenience and either surface may be toward or away from IR projector 106 and/or not all bottom nor top surfaces need to be on the same side of IR lens 1000. That is, the wedges may all face the same way or they may face different directions. Notably, the wedge angle may change between some or all of sections 1001-1003. Furthermore, the wedge angle may be in any suitable direction, d, with respect to IR lens 1000 such as a positive radial direction 1041 (i.e., the wedge is thinner near center 1010 and thicker toward edge 1011), a negative radial direction (i.e., the wedge is thicker near center 1010 and thinner toward edge 1011), a positive tangential direction 1042 (i.e., the wedge becomes thicker moving in a clockwise direction around IR lens 1000), a negative tangential direction (i.e., the wedge becomes thinner moving in a clockwise direction around IR lens 1000), or any angle therebetween.

Notably, between adjacent ones of sections 1001-1008 it may be advantageous to have opposing wedge directions such that the resultant IR features jump between positions as the sections move into and out of IR path 109. For example, as shown with respect to IR feature moves 1031, the variation between wedge angles, wedge directions, or both causes IR features to jump in position between an instance when section 1001 is in the IR path of the feature (e.g., acting on the feature) and an instance when another section (e.g., section 1008) is in the IR path of the feature (e.g., acting on the feature). Thereby, by having differing ones of sections 1001-1008 in IR path 109 or in different parts of IR path 109 over time, the IR features of temporally modified IR pattern 108 move over time. It is noted that such IR feature jumps may also be accomplished when changing from a planar portion (e.g., section 1004 as discussed below) and a wedge portion.

As shown with respect to section 1002 and section 1001, adjacent sections may have wedge angles of opposing directions and the same or different wedge angles. For example, section 1002 may have a wedge angle in either positive radial direction 1041 or positive tangential direction 1042 and section 1001 may have a wedge angle in negative radial direction or negative tangential direction 1042, or vice versa. As shown with respect to IR feature moves 1032, the variation between wedge directions then causes IR features to jump in position in the opposite direction. As shown with respect to section 1003, when adjacent sections have wedge angles of opposing directions but the difference in wedge angle is not as significant, IR feature moves 1033 of the same direction but lesser magnitude with respect to those of IR feature moves 1032 are provided.

As discussed, section 1004 may be a planar portion having a flat top surface 1023 and a flat bottom surface 1024 (opposite flat top surface 1022) that are substantially planar with respect to one another. Such a planar portion may provide no change to IR features and may be used as a baseline or a return to baseline with respect to subsequent or previous feature moves.

Furthermore, as shown with respect to section 1005, in some embodiments, one or more of sections 1001-1008 may include a wedge portion having a curved top surface 1025 and a flat bottom surface 1026 (opposite curved top surface 1025) and a wedge angle, α, therebetween, which may be any wedge angle discussed herein. With respect to curved wedge surfaces, the wedge angle may be defined with respect to a line or plane within the curved surface, as shown, or with respect to a line or plane tangential to curved top surface 1025. Notably, the use of a section having a wedge portion with a curved surface causes gradual movement of IR features in temporally modified IR pattern 108 as the curved wedge portion moves with respect to the IR feature, as shown with respect to IR feature moves 1034. Such movement allows the IR feature to trace a line or arced pattern thus reducing effective speckle. Such curved wedge portions may be used in any application discussed herein such as with respect to wedge portion 405 of IR lens 401, wedge portion 905 of IR lens 901, or any of sections 1001-1008.

As shown with respect to section interface 1009, by providing sections 1051 and 1052 have differing wedge angles and/or directions, a grey scale effect is provided with respect to IR feature 1035 and other features of IR pattern 107 such that, as modified over time within temporally modified IR pattern 108, more complex patterns can be created that can have high fill factor while still illuminating scene 121 with IR patterns. Thereby, subsequent stereoscopic matching as performed by stereoscopic module 102 has improved accuracy as more variation and granularity is provided in the IR pattern illuminating the scene during image capture.

As discussed, in implementation, the rotation speed of IR lens 1000 may be adjusted to provide different behavior in during temporally modified IR pattern 108 with respect to image capture by left and right cameras 104, 105.

Figure 11:
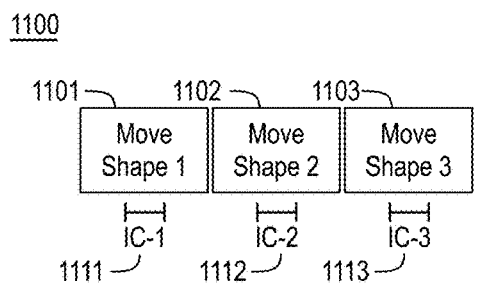
FIG. 11 is an example timing diagram for temporal IR pattern adjustment during image capture.

FIG. 11 is an example timing diagram for temporal IR pattern adjustment during image capture, arranged in accordance with at least some implementations of the present disclosure. As shown in FIG. 11, in some embodiments, a first lens shape 1101 (move shape 1) is moved during a first image capture 1111 (IC-1), a second lens shape 1102 (move shape 2) is moved during a second image capture 1112 (IC-2), and a third lens shape 1103 (move shape 3) is moved during a third image capture 1113 (IC-3). As noted above, in the context of stereoscopic imaging, such image capture indicates capture of two or more images simultaneously (e.g., one image each via left and right cameras 104, 105. Lens shapes 1101, 1102, 1103 may be any shapes discussed herein such as differing wedge portions, materials. Furthermore, the shape moved during image capture may repeat after three shapes such that first lens shape 1101 is used for a fourth image capture, second lens shape 1102 is used for a fifth image capture, and so on.

For example, controller 103 may provide signals to a motor to move sections 1001-1008 of IR lens 1000 such that a first section is moved in IR path 109 during a first image capture, a second section is moved in IR path 109 during a second image capture, and so on. For example, controller 103 may provide a signal to move a wedge portion and a planar portion or another wedge portion within the IR path at a rate synchronized to an image capture rate of scene 121 to provide only the wedge portion within the IR path during a first image capture and only the planar portion or the second wedge portion within the IR path during a second image capture. However, any combination of sections 1001-1008 may be moved within the IR path. Although illustrated with respect to three different shapes being moved during image with changes between such image captures, any number of shapes may be used. Notably, a single shape may be used such that the same lens shape 1101 is moved during any and all image captures. Furthermore, other characteristics may be changed during or between image captures such as motion (e.g., rotation) speed. In an embodiment, As shown, sections 1001-1008 may each be provided during an entirety of an image capture for a temporal sequence of image captures. Notably, such techniques may provide differing IR pattern illuminations of a scene between image captures to improve and/or average out stereoscopic matching over time, which may be tracked for example.

Figure 12:
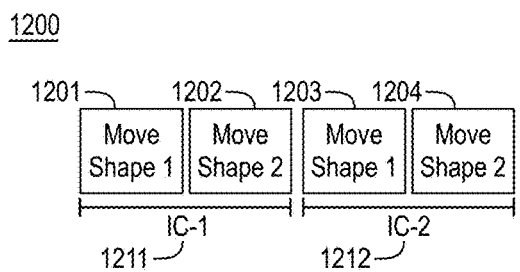
FIG. 12 is another example timing diagram for temporal IR pattern adjustment during image capture.

FIG. 12 is another example timing diagram for temporal IR pattern adjustment during image capture, arranged in accordance with at least some implementations of the present disclosure. As shown in FIG. 12, in some embodiments, multiple lens shapes are used to illuminate a scene during a single image capture. As shown, a first lens shape 1201 (move shape 1) is in IR path 109 either partially stationary or continually moving and then a second lens shape 1201 is also provided in IR path 109 either partially stationary or continually moving during a first image capture 1211 (IC-1). Then, during a second image capture 1212 (IC-2), first lens shape 1201 and second lens shape 1201 are again provided in IR path 109 either partially stationary or in a continually moving manner. Lens shapes 1201, 1202 may be any shapes discussed herein such as differing wedge portions, materials, etc. Furthermore, lens shapes moved during image capture may be the same or different over time (e.g., using a third lens shape and fourth lens shape during a third image capture, first lens shape 1201 and a fifth lens shape during a fourth image capture etc.) in any combination. Furthermore, although illustrated with respect to two lens shapes 1201, 1202 during any single exposure, any number may be used such as three, four, or more. Such numbers of lens shapes during any single exposure may be the same across exposures or they may change.

For example, controller 103 may provide signals to a motor to move sections 1001-1008 of IR lens 1000 such that a first section and a second section moved in IR path 109 during a first image capture, the first section and a second section are again moved in IR path 109 during a second image capture, and so on. For example, controller 103 may provide a signal to move a wedge portion and a planar portion or another wedge portion within the IR path at a rate such that both are within the IR path during the image capture. Any combination of sections 1001-1008 may be moved within the IR path during a single exposure. Although illustrated with respect to two different shapes being moved during image capture, any number of shapes may be used. Such sections may have any varying characteristics discussed herein.

Figure 13:
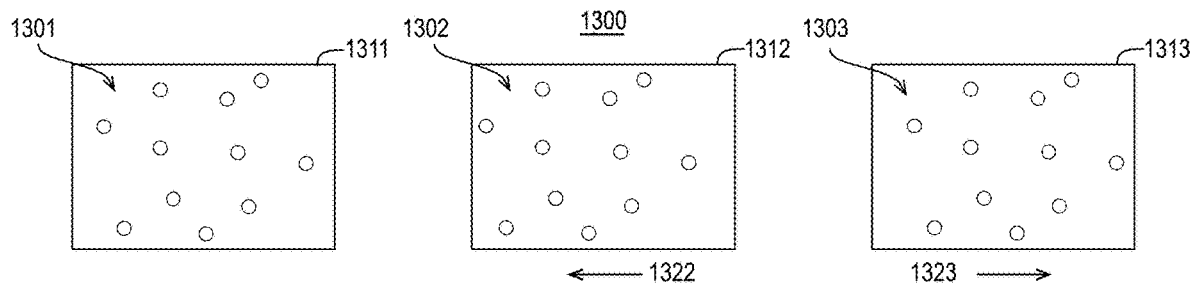
FIG. 13 illustrates exemplary temporally modified IR patterns for different image capture instances.
Figure 14:
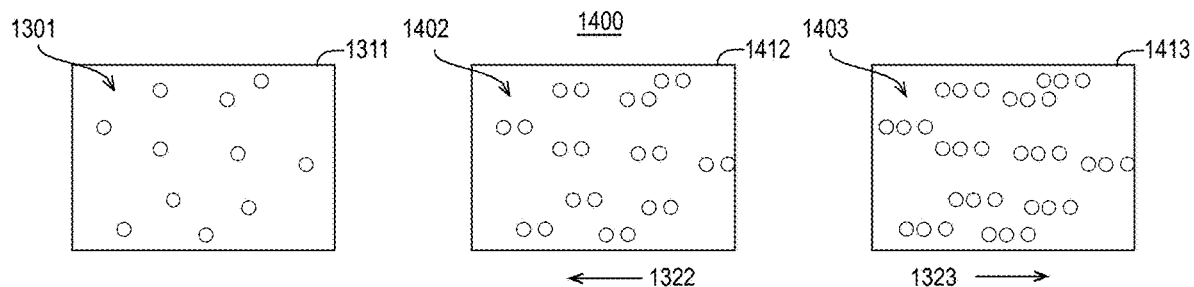
FIG. 14 illustrates exemplary temporally modified IR patterns for different image capture instances.
Figure 15:
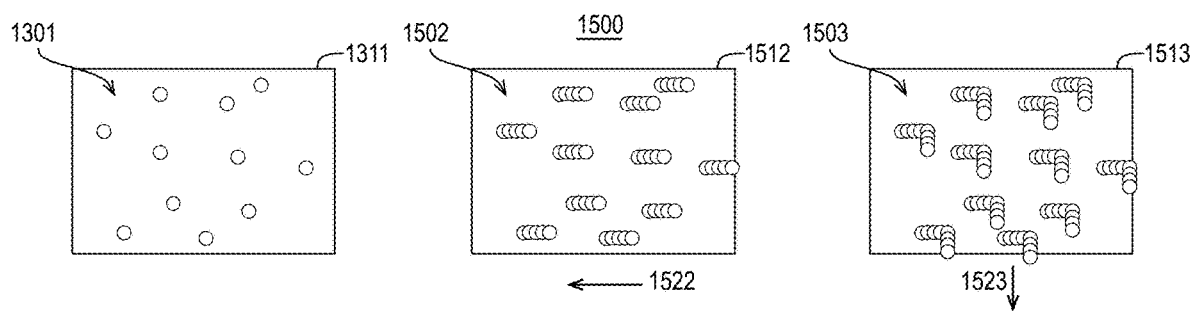
FIG. 15 illustrates exemplary temporally modified IR patterns for different image capture instances.

Such temporal changes modify IR pattern 107 to generate temporally modified IR pattern 108, which advantageously has varying characteristics for improved stereoscopy. FIGS. 13-15 illustrate exemplary temporally modified IR patterns that may be implemented between image capture or within image capture to attain varying effects within modified IR pattern 108. Such effects may be attained by implementation of any of IR projection systems 400, 800, 900 as discussed above or either of IR projection systems 1700, 1800 as discussed herein below.

FIG. 13 illustrates exemplary temporally modified IR patterns 1300 for different image capture instances, arranged in accordance with at least some implementations of the present disclosure. As shown in FIG. 13, for a first image capture 1311, multiple IR features may form a first IR pattern 1301, for a second image capture 1312, multiple IR features may form a second IR pattern 1302, and for a third image capture 1313, multiple IR features may form a third IR pattern 1303. In an embodiment, the temporally modified IR patterns of FIG. 13 may be generated by having a first wedge portion (or a planar portion) in IR path 109 for first image capture 1311, a second wedge portion in IR path 109 for second image capture 1312, and a third wedge portion in IR path 109 for third image capture 1313. Notably, the change from the first wedge portion (or planar portion) to the second wedge portion provides for a spatial shift 1322 of the IR features from first IR pattern 1301 to second IR pattern 1302. That is, the change in wedge angle and/or direction causes the IR features to jump from their positions in first IR pattern 1301 to their positions in second IR pattern 1302. It is noted that motion of the first wedge portion (or planar portion) or the second wedge portion during image capture does not cause significant shifting during exposure as the IR features are exposed to the same wedge angle during the exposure. However, the abrupt change in wedge angle and/or direction causes spatial shift 1322 as illustrated.

Similarly, the change from the second wedge portion to the third wedge portion provides for a spatial shift 1323 of the IR features from second IR pattern 1302 to third IR pattern 1303. Again, the change in wedge angle and/or direction causes the IR features to jump from their positions in second IR pattern 1302 to their positions in third IR pattern 1303. Such changes do not alter the density of IR features between IR patterns 1301, 1302, 1303; however their spatial locations change significantly. Such changes between IR patterns 1301, 1302, 1303 may be generated using differing wedge (or planar) portions as discussed with respect to IR lens 1000, differing wedge (or planar) portions as discussed below with respect to IR lens 1700 (e.g., a similar segmented IR lens using linear motion instead of rotational motion), or as discussed below with respect to dynamic transmissive IR element 1800 (e.g., a solid state beam deflector or a liquid crystal display device). Furthermore, the changes between IR patterns 1301, 1302, 1303 may be generated using the timing diagram of FIG. 11 where individual shapes are moved during each individual exposure.

FIG. 14 illustrates exemplary temporally modified IR patterns 1400 for different image capture instances, arranged in accordance with at least some implementations of the present disclosure. As shown in FIG. 14, for first image capture 1311, multiple IR features form first IR pattern 1301 as discussed with respect to FIG. 13. For a second image capture 1412, multiple IR features form a second IR pattern 1402 and for a third image capture 1413, multiple IR features form a third IR pattern 1403. In an embodiment, the temporally modified IR patterns of FIG. 14 may be generated by having a first wedge portion (or a planar portion) in IR path 109 for first image capture 1311 as discussed with respect to FIG. 13.

For second image capture 1412, during image capture, the first wedge portion (or planar portion) used for image capture 1311 is provided in IR path 109 for a first time portion of second image capture 1412 and a second wedge portion is provided in IR path for a second time portion of second image capture 1412. That is, second image capture 1412 has a first wedge portion (or planar portion) to provide the IR features as shown with respect to first image capture 1311 and, subsequently, a second wedge portion having a different wedge angle and/or wedge direction to make the IR features jump to new positions as shown with respect to spatial shift 1322. The IR features are then captured in two positions to provide second IR pattern 1402, which has twice the IR feature density as compared to first IR pattern 1301.

Similarly, for third image capture 1413, during image capture, the first wedge portion (or planar portion) used for image capture 1311 is provided in IR path 109 for a first time portion of third image capture 1413, the second wedge portion is provided in IR path 109 for a second time portion of third image capture 1413, and a third wedge portion is provided in IR path 109 for a third time portion of third image capture 1413. As with second image capture 1412, third image capture 1413 has a first wedge portion (or planar portion) to provide the IR features as shown with respect to first image capture 1311, a second wedge portion having a different wedge angle and/or wedge direction to make the IR features jump to new positions as shown with respect to spatial shift 1322, and a third wedge portion having yet again a different wedge angle and/or wedge direction to make the IR features jump to new positions as shown with respect to spatial shift 1323. The IR features are then captured in three positions to provide third IR pattern 1403, which has three times the IR feature density as compared to first IR pattern 1301.

The change in wedge angle and/or direction causes the IR features to jump from their positions in first IR pattern 1301 to their positions in second IR pattern 1302 and then again to their positions in third IR pattern 1303, all of which are captured during third image capture 1413. Such IR patterns 1402, 1403 may be generated using differing wedge (or planar) portions as discussed with respect to IR lens 1000, differing wedge (or planar) portions as discussed below with respect to IR lens 1700 (e.g., a similar segmented IR lens using linear motion instead of rotational motion), or as discussed below with respect to dynamic transmissive IR element 1800 (e.g., a solid state beam deflector or a liquid crystal display device). Furthermore, the changes between IR patterns 1301, 1302, 1303 may be generated using the timing diagram of FIG. 12 where multiple shapes are moved in an IR path during each individual exposure.

FIG. 15 illustrates exemplary temporally modified IR patterns 1500 for different image capture instances, arranged in accordance with at least some implementations of the present disclosure. As shown in FIG. 15, for first image capture 1311, multiple IR features form first IR pattern 1301 as discussed with respect to FIG. 13. For a second image capture 1512, the multiple IR features of first IR pattern 1301 are moved substantially linearly, during a second image capture to form a second IR pattern 1502 and for a third image capture 1513, the multiple IR features of first IR pattern 1301 are moved substantially linearly turned at an angle and are again moved substantially linearly in a second (e.g., orthogonal) direction to form a third IR pattern 1403. In an embodiment, the temporally modified IR patterns of FIG. 15 may be generated by having a first wedge portion (or a planar portion) in IR path 109 for first image capture 1311 as discussed with respect to FIG. 13.

For second image capture 1512, during image capture, a curved wedge portion (i.e., a wedge having one curved surface as discussed herein) is moved in IR path 109 during image capture to move the image features in spatial shift direction 1522 during image capture. That is, the motion of the curved wedge portion during image capture causes the IR features of first IR pattern 1301 to provide IR pattern 1502 such that dot IR features of first IR pattern 1301 provide linear IR features in second IR pattern 1502. Such patterns are advantageous as they reduce sparkle. Spatial shift direction 1522 may be in any direction as controlled by the selected wedge direction.

Furthermore, for third image capture 1513, during image capture, the first curved wedge portion is moved in IR path 109 during a first time portion of the image capture to move the image features during image capture and then a second curved wedge portion having a different wedge angle or direction or both is moved in IR path 109 during a second time portion of the image capture. That is, the motion of the first curved wedge portion during image capture causes the IR features of first IR pattern 1301 to move in spatial shift direction 1522 and the motion of the second curved wedge portion during image capture causes the IR features of first IR pattern 1301 to move in spatial shift direction 1523, which, as shown, may be orthogonal to spatial shift direction 1522. For example, the first curved wedge portion and the second curved wedge portion may have wedge directions that are orthogonal or at another angle with respect to one another. Such IR patterns 1502, 1503 may be generated using differing curved wedge portions as discussed with respect to IR lens 1000, differing curved wedge portions as discussed below with respect to IR lens 1700 (e.g., a similar segmented IR lens using linear motion instead of rotational motion), controlled rotation of IR lenses 401, 901 as discussed with respect to FIG. 9, or as discussed below with respect to dynamic transmissive IR element 1800 (e.g., a solid state beam deflector or a liquid crystal display device). Furthermore, the changes between IR patterns 1301, 1302, 1303 may be generated using the timing diagram of FIG. 12 where multiple shapes are moved in an IR path during each individual exposure.

Figure 16:
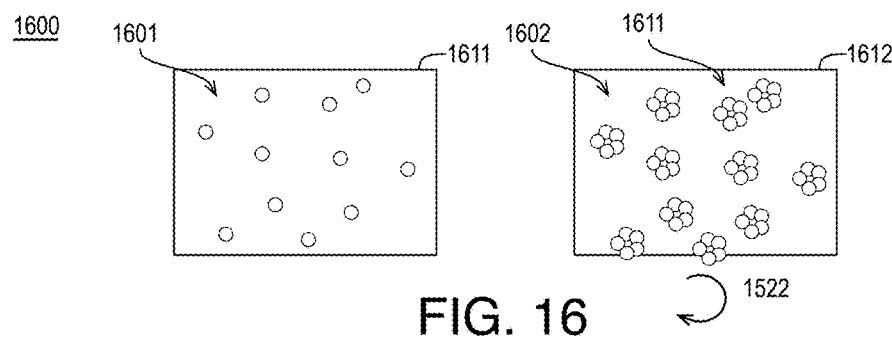
FIG. 16 illustrates exemplary temporally modified IR patterns for different image capture instances.

FIG. 16 illustrates exemplary temporally modified IR patterns 1600 for different image capture instances, arranged in accordance with at least some implementations of the present disclosure. As shown in FIG. 16, for first image capture 1311, multiple IR features form first IR pattern 1301 as discussed with respect to FIG. 13. For a second image capture 1612, the multiple IR features of first IR pattern 1301 are moved substantially circularly, during a second image capture to form a second IR pattern 1602. In an embodiment, the temporally modified IR pattern of second IR pattern 1602 is generated by having a first wedge portion that extends across IR path 109 (please refer to FIG. 4) rotate across IR path 109.

Thereby, as discussed with respect to FIG. 7, the paths of IR features of first IR pattern 1301 move in an arc or circular pattern to generate individual circular (or arced) IR features as shown with respect to IR feature 1611. That is, during image capture, a wedge portion is rotated in IR path 109 during the image capture to move the image features in a spatial rotation 1622 during image capture. The motion of the wedge portion during image capture causes the IR features of first IR pattern 1301 to provide IR pattern 1602 such that dot IR features of first IR pattern 1301 provide circular IR features (or portions of circular features) in second IR pattern 1602. IR pattern 1602 may be generated using a single wedge portion as discussed with respect to IR lens 401 as discussed with respect to FIG. 4, controlled rotation of IR lenses 401, 901 as discussed with respect to FIG. 9, or as discussed below with respect to dynamic transmissive IR element 1800 (e.g., a solid state beam deflector or a liquid crystal display device). Furthermore, IR pattern 1602 may be generated using the timing diagram of FIG. 11 where a single shape is moved in an IR path during an individual exposure.

Figure 17:
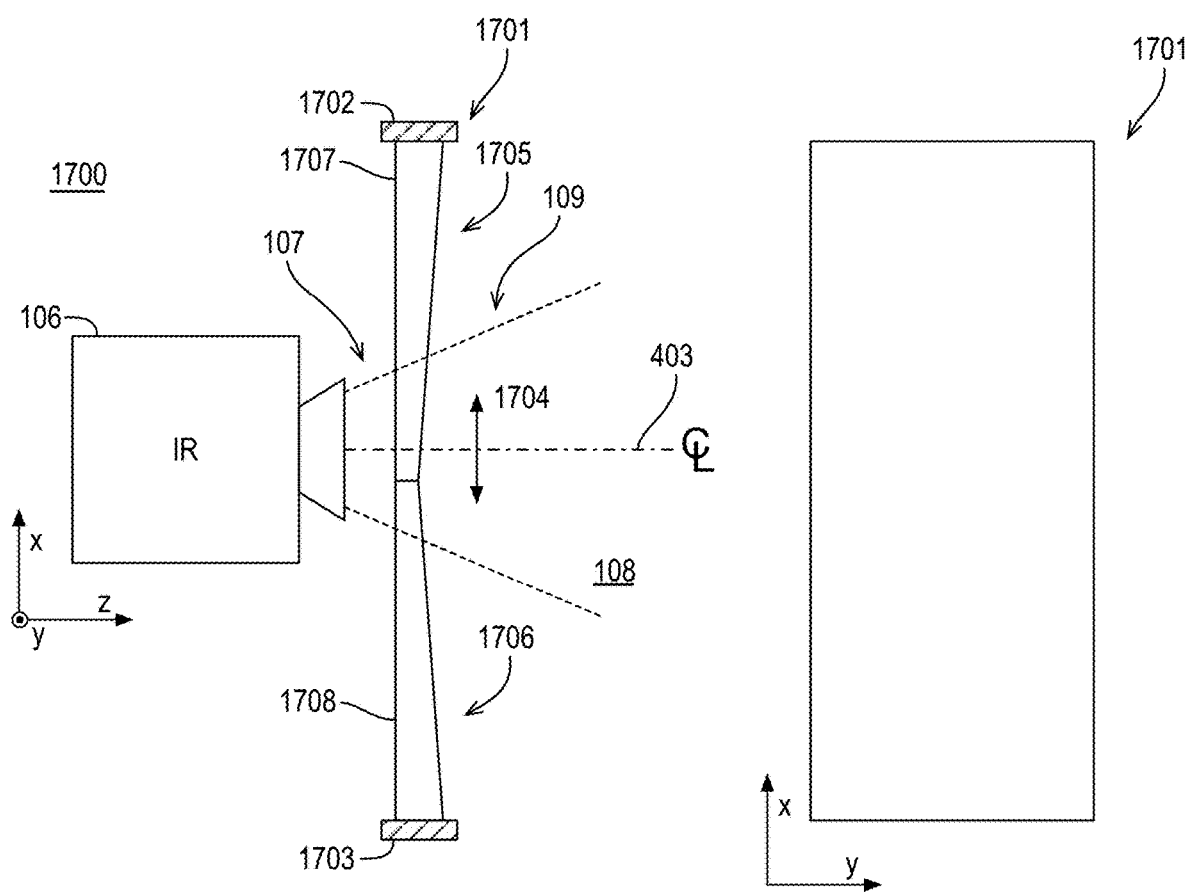
FIG. 17 is a diagram of an example IR projection system with an IR lens having sections with differing characteristics moved laterally in an IR path.

FIG. 17 is a diagram of an example IR projection system 1700 with an IR lens having sections with differing characteristics moved laterally in an IR path, arranged in accordance with at least some implementations of the present disclosure. As shown in FIG. 17, IR projection system 1700 is similar to IR projection system 400 with the exception that IR projection system 1700 includes an IR lens 1701 moveable via mounts 1702, 1703 that are coupled to one or two linear motors to drive IR lens 1701 in direction 1704 (e.g., in a horizontal x-direction) and/or a vertical y-direction (or any suitable linear directions in the x-y plane).

As shown, IR lens 1701 includes two sections 1705, 1706 having different wedge portions 1707, 1708, respectively. In the illustrated embodiment, wedge portions 1707, 1708 have the same wedge angles but opposing wedge directions in the x-direction. Such wedge portions 1707, 1708 provide for movement of IR features either between or during image capture as discussed herein. Although illustrated with two sections 1705, 1706 having different wedge portions 1707, 1708 having the same wedge angles but opposing wedge directions in the x-direction, IR lens 1701 may include any number of sections and any combination of sections of differing lens materials, wedge portions (of differing wedge angle and/or wedge direction), planar portions, curved wedges, etc. as discussed herein with respect to IR lens 1000 and elsewhere herein.

IR lens 1701 is laterally moveable within IR path 109 to provide temporally modified IR pattern 108 as discussed herein. In an embodiment, both of wedge portions 1707, 1708 are provided within IR path 109 during separate portions of an image capture to generate IR feature shifts as discussed with respect to IR feature moves 1031. In an embodiment, one or both of wedge portions 1707, 1708 are curved wedges and motion during exposure causes gradual movement of IR features in temporally modified IR pattern 108 as the curved wedge portion moves with respect to the IR feature, as discussed with respect to IR feature moves 1034. Notably, any effect generated by IR lens 1000 may be generated by IR lens 1701 where IR lens 1000 is implemented using a moveable disc that provides rotational movement and IR lens 1701 is implemented using a moveable lens (e.g., a rectangular lens) that provides translational movement.

Figure 18:
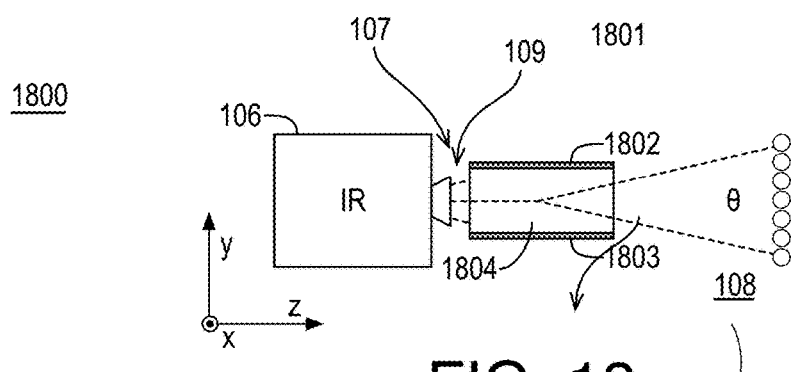
FIG. 18 is a diagram of an example IR projection system implementing a dynamic transmissive IR element.

FIG. 18 is a diagram of an example IR projection system 1800 implementing a solid state dynamic transmissive IR element 1801, arranged in accordance with at least some implementations of the present disclosure. As shown in FIG. 18, IR projection system 1800 may implement IR projector 106 as disused herein and a dynamic transmissive IR element 1801 within IR path 109. As shown, solid state dynamic transmissive IR element 1801 may dynamically alter IR pattern 107 under control of controller 103 (not shown). Dynamic transmissive IR element 1801 may be any suitable device capable of altering IR features of IR pattern 107 within a range, $\theta$, that allows alteration in any direction in the x-y plane. In the illustrated embodiment, dynamic transmissive IR element 1801 is a solid state beam deflector having an anode 1802, a cathode 1803, and a KTN crystal 1804 therebetween. As shown, anode 1802 and cathode 1803 are oriented opposite one another in the y-direction, dynamic transmissive IR element 1801 may also include a second anode and cathode pair that are oriented opposite one another in the x-direction (and additional pairs as needed). By applying voltage between anode 1802 and cathode 1803 (and/or other anode-cathode pairs), the path of radiation of IR pattern 107 is altered as shown with respect to IR radiation 1805. Thereby, temporally modified IR pattern 108 as discussed herein may be generated from IR pattern 107 as discussed herein. Notably, solid state dynamic transmissive IR element 1801 may replicate any temporally modified IR pattern 108 discussed herein under the control of a signal from controller 103. Although illustrated with respect to a solid state beam deflector, dynamic transmissive IR element 1801 may include any device capable of adjusting IR pattern 107 to generate modified IR pattern 108 having characteristics discussed herein. In some embodiments, dynamic transmissive IR element 1801 is a transmissive liquid crystal display device. In some embodiments, dynamic transmissive IR element 1801 is an adjustable elastomer lens. In some embodiments, dynamic transmissive IR element 1801 includes a 2D lens array or a 2D mirror array.

Figure 19:
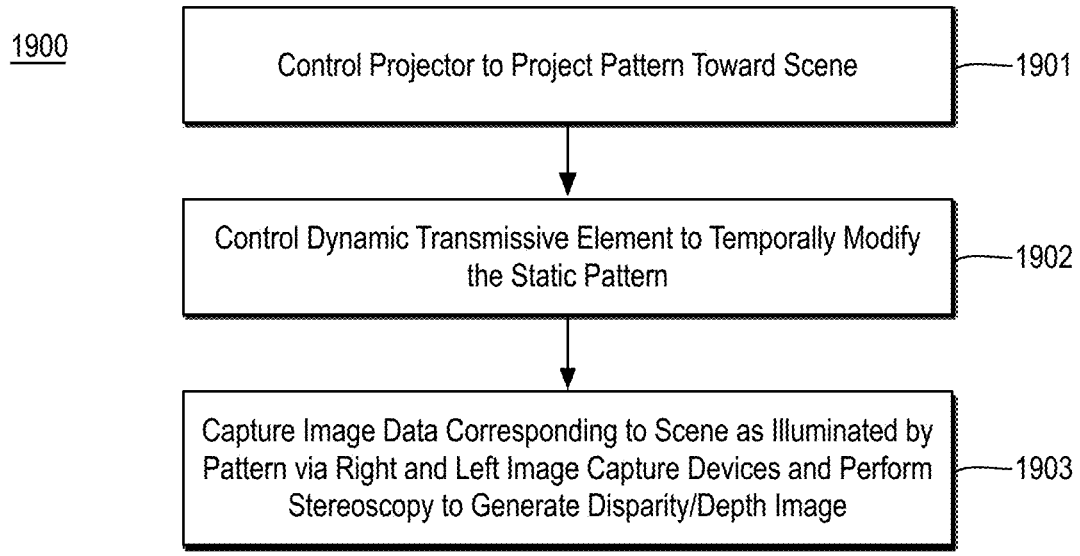
FIG. 19 is a flow diagram illustrating an example process for performing stereoscopic imaging.

FIG. 19 is a flow diagram illustrating an example process 1900 for performing stereoscopic imaging, arranged in accordance with at least some implementations of the present disclosure. Process 1900 may include one or more operations 1901-1903 as illustrated in FIG. 19. Process 1900 may form at least part of stereoscopic imaging process. By way of non-limiting example, process 1900 may form at least part of stereoscopic imaging process as performed by any device, system, or combination thereof as discussed herein. Furthermore, process 1900 will be described herein with reference to system 2000 of FIG. 20, which may perform one or more operations of process 1900.

Figure 20:
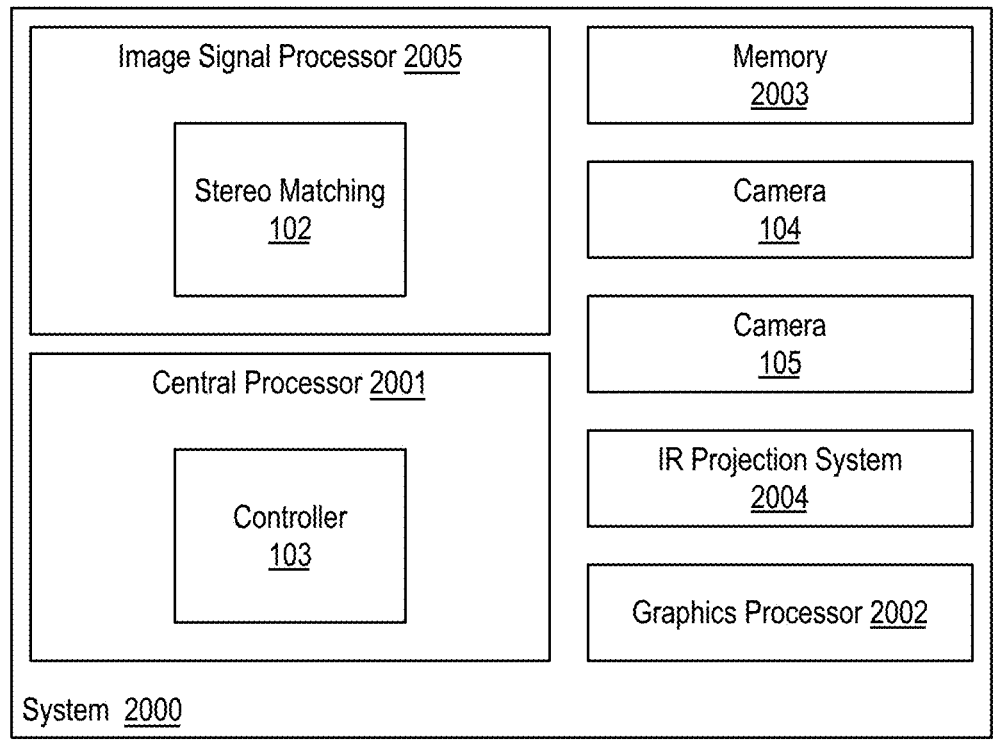
FIG. 20 is an illustrative diagram of an example system for performing stereoscopic imaging.

FIG. 20 is an illustrative diagram of an example system 2000 for performing stereoscopic imaging, arranged in accordance with at least some implementations of the present disclosure. As shown in FIG. 20, system 2000 includes a central processor 2001, a graphics processor 2002, a memory 2003, cameras 104, 105, a projection system 2004, and an image signal processor (ISP) 2005. Also as shown, central processor 2001 may include or implement controller 103 and ISP 2005 may include or implement stereo matching module 102. In the example of system 2000, memory 2003 may store image data, depth images, control signals, and/or any other data as discussed herein.

As shown, in some embodiments, controller 103 is implemented by central processor 2001 and stereo matching module 102 is implemented by ISP 2005. In some embodiments, both of stereo matching module 102 and controller 103 are implemented by ISP 2005. In some embodiments, both of stereo matching module 102 and controller 103 are implemented by central processor 2001. In some embodiments, one or both of stereo matching module 102 and controller 103 are implemented by graphics processor 2002.

Graphics processor 2002 may include any number and type of graphics processing units that may provide the operations discussed herein. For example, graphics processor 2002 may include circuitry dedicated to manipulate image data, or the like obtained from memory 2003. ISP 2005 may include any number and type of image signal or image processing units that may provide the operations discussed. For example, ISP 2005 may include circuitry dedicated to manipulate image data such as an ASIC or the like. Central processor 2001 may include any number and type of processing units or modules that may provide control and other high level functions for system 2000 and/or provide the operations discussed herein. Memory 2003 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 2003 may be implemented by cache memory.

In an embodiment, one or both or portions of stereo matching module 102 and controller 103 are implemented via an execution unit (EU) of ISP 2005 or graphics processor 2002. The EU may include, for example, programmable logic or circuitry such as a logic core or cores that may provide a wide array of programmable logic functions. In an embodiment, one or both or portions of stereo matching module 102 and controller 103 are implemented via dedicated hardware such as fixed function circuitry or the like of ISP 2005 or graphics processor 2002. Fixed function circuitry may include dedicated logic or circuitry and may provide a set of fixed function entry points that may map to the dedicated logic for a fixed purpose or function.

As discussed herein, cameras 104, 105 attain image data of a scene including a temporally modified IR and/or visible light pattern from projection system 2004. Projection system 2004 may be any projection system discussed herein such as any of projection systems 400, 800, 900, 1700, 1800 configured to emit IR radiation, visible light, or both. In an embodiment, one or both of cameras 104, 105 include a CMOS sensors. Cameras 104, 105 may be color cameras, monochrome cameras, black and white cameras, or IR cameras.

Returning to discussion of FIG. 19, process 1900 begins at operation 1901, where a projector is controlled to project a (static) pattern (IR or visible light or a combination thereof) toward a scene. For example, IR projector 106 under control of controller 103 via control signals 113 may project an IR pattern toward a scene such that the IR pattern includes any number and pattern of IR features, which may be dots, line segments, etc.

Processing continues at operation 1902, where a dynamic transmissive element is controlled to temporally modify the static pattern before it reaches the scene. The dynamic transmissive element may include any motor controlled lens or other dynamic transmissive element discussed herein. In an embodiment, the dynamic transmissive element is an optical path between the projector and the scene. In an embodiment, the dynamic transmissive element is in a direct path between the projector and the scene such that the direct path is linearly between the projector and the scene. For example, the dynamic transmissive element may be coupled to a controller that signals the dynamic transmissive element during illumination of the scene by the projector. As discussed, the dynamic transmissive element is to temporally modify the static pattern from the projector.

In an embodiment, the dynamic transmissive element is a solid state beam deflector. In an embodiment, the dynamic transmissive element is a transmissive liquid crystal display device. In an embodiment, the controller is to provide a signal to the dynamic transmissive element to provide feature movement and constant feature density of features of the pattern between temporally adjacent images captured by the first and second image capture devices. For example, the dynamic transmissive element may provide first features in a first pattern during a first image capture and second features in a second pattern during a second image capture such that the features are at different locations in the first and second patterns but have the same feature density.

In an embodiment, the controller is to provide a signal to the dynamic transmissive element to provide increased feature density of the projected features in a captured image relative to the pattern. For example, the dynamic transmissive element may provide first features in a first I pattern during a first image capture and second features in a second pattern during a second image capture such that the second pattern has an increased feature density with respect to the first pattern. For example, the features may be caused to jump to new locations during the image capture.

In an embodiment, the controller is to provide a signal to the dynamic element to provide movement of a feature of the pattern during image capture by the first and second image capture devices. For example, the features of the pattern may trace a linear path or a circular path as discussed herein. In an embodiment, the controller is to provide a signal to the dynamic transmissive element to provide an angled movement of a feature of the pattern during image capture by the first and second image capture devices. For example, the features of the pattern may trace a first linear path and then a second linear path substantially orthogonal to the first linear path as discussed herein.

In some embodiments, the dynamic transmissive element includes a lens moveably mounted in a path between the projector and the scene such that the IR lens has a wedge portion having a wedge angle and such that the IR lens being moveably mounted in the IR path includes the wedge portion of the IR lens being moveable within the IR path. In some embodiments, the wedge angle is not less than 0.1 degrees, not less than 0.2 degrees, not less than 0.25 degrees, not less than 0.5 degrees, not less than 1 degree, or not less than 2 degrees.

In an embodiment, in any of the moveable positions of the lens position, the wedge portion extends across a centerline of the optical or IR path corresponding to a centerline of the scene. In an embodiment, the lens is a disc, the lens being moveably mounted in the path includes the lens disc being rotatably mounted at a center point of the disc, and the center point of the disc is within the wedge portion and aligned with the centerline. In some embodiments, the dynamic transmissive element includes a second lens disc rotatably mounted substantially at a center point of the second lens disc such that the second lens disc is independently moveable with respect to the lens disc. In an embodiment, the lens being moveably mounted in the optical path comprises the lens being linearly movable substantially orthogonal to the centerline of the path.

In an embodiment, the lens further includes a planar portion or a second wedge portion at a second wedge angle such that the wedge portion includes a first flat surface and a second flat surface opposite the first flat surface and angled with respect to the first flat surface at the wedge angle, and such that the controller is to provide a signal to move the wedge portion and the planar portion or the second wedge portion within the optical path at a rate synchronized to an image capture rate of the scene to provide only the wedge portion within the path during a first image capture and only the planar portion or the second wedge portion within the path during a second image capture.

In an embodiment, the lens further includes a planar portion or a second wedge portion at a second wedge angle such that the wedge portion includes a first flat surface and a second flat surface opposite the first flat surface and angled with respect to the first flat surface at the wedge angle, and such that the controller is to provide a signal to move both the wedge portion and the planar portion or the second wedge portion within the path during an image capture of the scene to provide increased feature density of the projected features relative to the pattern in a captured image.

In an embodiment, the wedge portion comprises a flat surface and a curved surface opposite the flat surface and angled with respect to the flat surface at the wedge angle, and the controller is to provide a signal to move the wedge portion within the path during an image capture of the scene to provide movement of a feature of the pattern during the image capture. In an embodiment, the lens further includes a second wedge portion at a second wedge angle such that the wedge portion and the second wedge portion each include a flat surface and a curved surface opposite the flat surface and angled with respect to the flat surface at the wedge angle and the second wedge angle, respectively, and such that the controller is to provide a signal to move both the wedge portion and the second wedge portion within the path during an image capture of the scene to provide an angled movement of a feature of the pattern during the image capture.

Processing continues at operation 1903, where image data corresponding to the scene as illuminated by the pattern are captured using first and second image capture devices. For example, the image capture devices may be controlled by the controller to attain image data of the scene at any number of image capture instances.

In the discussion of FIG. 19, the projector may emit visible light, IR radiation, or both and, correspondingly the lenses, dynamic transmissive IR elements, etc. may act upon visible light, IR radiation, or both. Furthermore, the features and patterns may include visible light, IR radiation, or both acting upon a scene. Process 1900 may be repeated any number of times either in series or in parallel for any number of image capture operations or the like. For example, process 1900 provides for improved temporally modified IR texture patterns during image capture for improved stereoscopy.

Various components of the systems described herein may be implemented in software, firmware, and/or hardware and/or any combination thereof. For example, various components of the systems discussed herein may be provided, at least in part, by hardware of a computing System-on-a-Chip (SoC) such as may be found in a computing system such as, for example, a smartphone. Those skilled in the art may recognize that systems described herein may include additional components that have not been depicted in the corresponding figures. For example, the systems discussed herein may include additional components such as communications modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the systems discussed herein or any other module or component as discussed herein.

As used in any implementation described herein, the term "module" or "component" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 21:
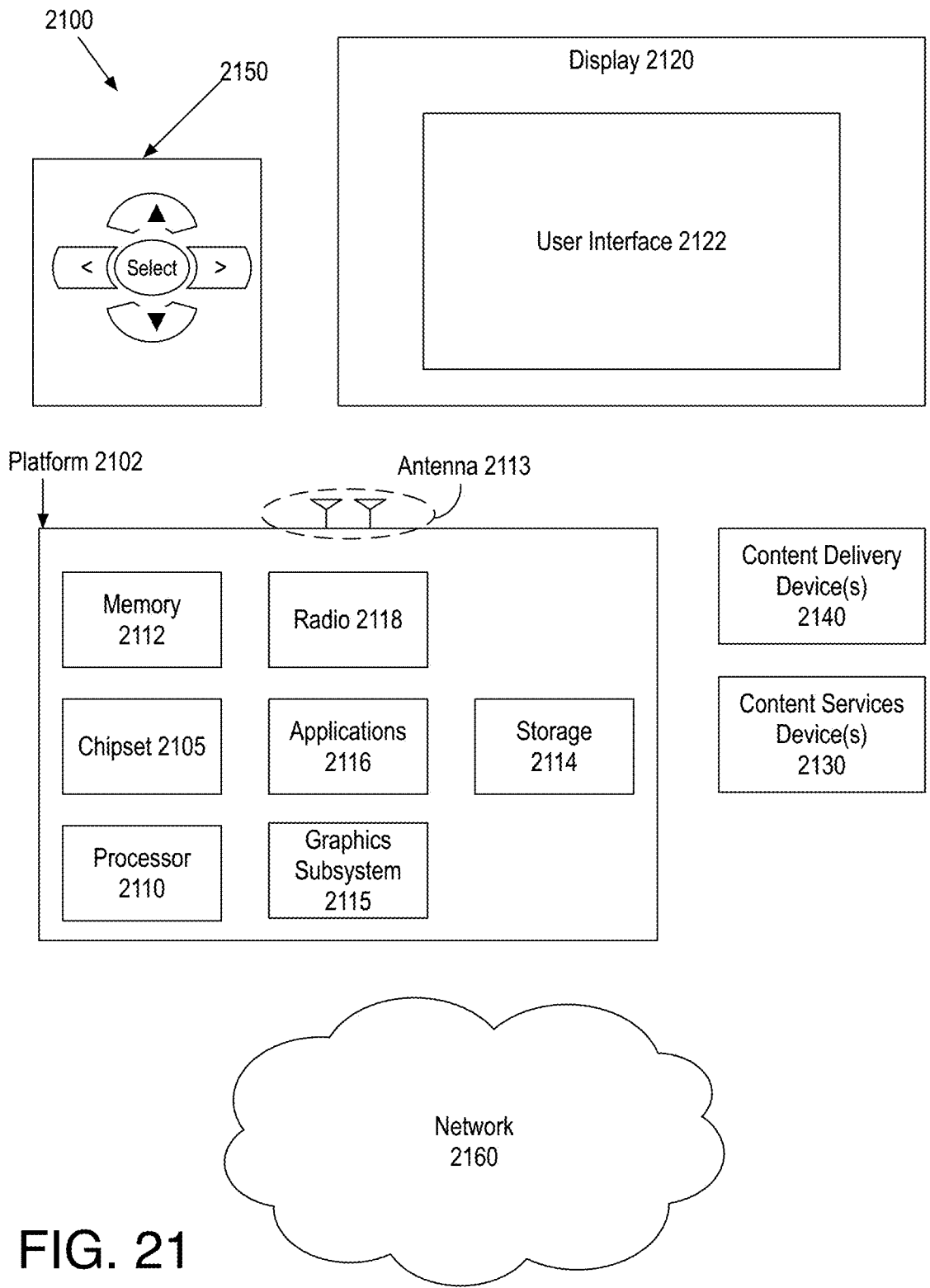
FIG. 21 is an illustrative diagram of an example system.

FIG. 21 is an illustrative diagram of an example system 2100, arranged in accordance with at least some implementations of the present disclosure. In various implementations, system 2100 may be a mobile system although system 2100 is not limited to this context. System 2100 may implement and/or perform any modules or techniques discussed herein. For example, system 2100 may be incorporated into a personal computer (PC), sever, laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, smart tablet or smart television), mobile internet device (MID), messaging device, data communication device, cameras (e.g. point-and-shoot cameras, super-zoom cameras, digital single-lens reflex (DSLR) cameras), and so forth. In some examples, system 2100 may be implemented via a cloud computing environment.

In various implementations, system 2100 includes a platform 2102 coupled to a display 2120. Platform 2102 may receive content from a content device such as content services device(s) 2130 or content delivery device(s) 2140 or other similar content sources. A navigation controller 2150 including one or more navigation features may be used to interact with, for example, platform 2102 and/or display 2120. Each of these components is described in greater detail below.

In various implementations, platform 2102 may include any combination of a chipset 2105, processor 2110, memory 2112, antenna 2113, storage 2114, graphics subsystem 2115, applications 2116 and/or radio 2118. Chipset 2105 may provide intercommunication among processor 2110, memory 2112, storage 2114, graphics subsystem 2115, applications 2116 and/or radio 2118. For example, chipset 2105 may include a storage adapter (not depicted) capable of providing intercommunication with storage 2114.

Processor 2110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 2110 may be dual-core processor(s), dual-core mobile processor(s), and so forth.

Memory 2112 may be implemented as a volatile memory device such as, but not limited to, a Random Access Memory (RAM), Dynamic Random Access Memory (DRAM), or Static RAM (SRAM).

Storage 2114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 2114 may include technology to increase the storage performance enhanced protection for valuable digital media when multiple hard drives are included, for example.

Graphics subsystem 2115 may perform processing of images such as still or video for display. Graphics subsystem 2115 may be a graphics processing unit (GPU) or a visual processing unit (VPU), for example. An analog or digital interface may be used to communicatively couple graphics subsystem 2115 and display 2120. For example, the interface may be any of a High-Definition Multimedia Interface, DisplayPort, wireless HDMI, and/or wireless HD compliant techniques. Graphics subsystem 2115 may be integrated into processor 2110 or chipset 2105. In some implementations, graphics subsystem 2115 may be a stand-alone device communicatively coupled to chipset 2105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 2118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 2118 may operate in accordance with one or more applicable standards in any version.

In various implementations, display 2120 may include any television type monitor or display. Display 2120 may include, for example, a computer display screen, touch screen display, video monitor, television-like device, and/or a television. Display 2120 may be digital and/or analog. In various implementations, display 2120 may be a holographic display. Also, display 2120 may be a transparent surface that may receive a visual projection. Such projections may convey various forms of information, images, and/or objects. For example, such projections may be a visual overlay for a mobile augmented reality (MAR) application. Under the control of one or more software applications 2116, platform 2102 may display user interface 2122 on display 2120.

In various implementations, content services device(s) 2130 may be hosted by any national, international and/or independent service and thus accessible to platform 2102 via the Internet, for example. Content services device(s) 2130 may be coupled to platform 2102 and/or to display 2120. Platform 2102 and/or content services device(s) 2130 may be coupled to a network 2160 to communicate (e.g., send and/or receive) media information to and from network 2160. Content delivery device(s) 2140 also may be coupled to platform 2102 and/or to display 2120.

In various implementations, content services device(s) 2130 may include a cable television box, personal computer, network, telephone, Internet enabled devices or appliance capable of delivering digital information and/or content, and any other similar device capable of uni-directionally or bi-directionally communicating content between content providers and platform 2102 and/display 2120, via network 2160 or directly. It will be appreciated that the content may be communicated uni-directionally and/or bi-directionally to and from any one of the components in system 2100 and a content provider via network 2160. Examples of content may include any media information including, for example, video, music, medical and gaming information, and so forth.

Content services device(s) 2130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 2102 may receive control signals from navigation controller 2150 having one or more navigation features. The navigation features of navigation controller 2150 may be used to interact with user interface 2122, for example. In various embodiments, navigation controller 2150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 2150 may be replicated on a display (e.g., display 2120) by movements of a pointer, cursor, focus ring, or other visual indicators displayed on the display. For example, under the control of software applications 2116, the navigation features located on navigation controller 2150 may be mapped to virtual navigation features displayed on user interface 2122, for example. In various embodiments, navigation controller 2150 may not be a separate component but may be integrated into platform 2102 and/or display 2120. The present disclosure, however, is not limited to the elements or in the context shown or described herein.

In various implementations, drivers (not shown) may include technology to enable users to instantly turn on and off platform 2102 like a television with the touch of a button after initial boot-up, when enabled, for example. Program logic may allow platform 2102 to stream content to media adaptors or other content services device(s) 2130 or content delivery device(s) 2140 even when the platform is turned "off" In addition, chipset 2105 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 2100 may be integrated. For example, platform 2102 and content services device(s) 2130 may be integrated, or platform 2102 and content delivery device(s) 2140 may be integrated, or platform 2102, content services device(s) 2130, and content delivery device(s) 2140 may be integrated, for example. In various embodiments, platform 2102 and display 2120 may be an integrated unit. Display 2120 and content service device(s) 2130 may be integrated, or display 2120 and content delivery device(s) 2140 may be integrated, for example. These examples are not meant to limit the present disclosure.

In various embodiments, system 2100 may be implemented as a wireless system, a wired system, or a combination of both. When implemented as a wireless system, system 2100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 2100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 2102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 21.

Figure 22:
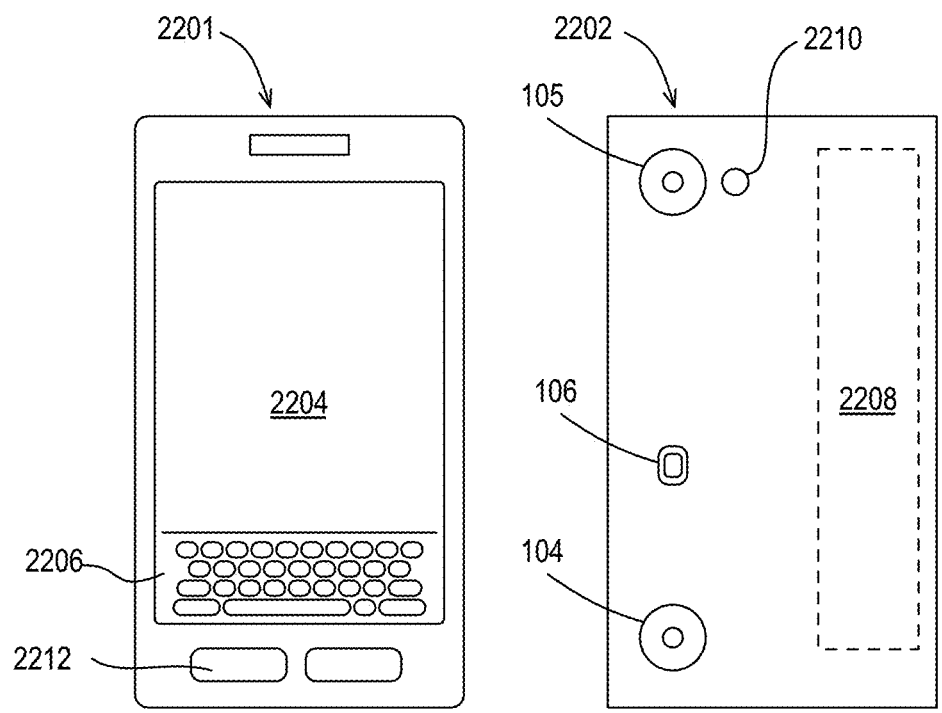
FIG. 22 illustrates an example small form factor device, all arranged in accordance with at least some implementations of the present disclosure.

As described above, system 2100 may be embodied in varying physical styles or form factors. FIG. 22 illustrates an example small form factor device 2200, arranged in accordance with at least some implementations of the present disclosure. In some examples, system 2100 may be implemented via device 2200. In other examples, other systems discussed herein or portions thereof may be implemented via device 2200. In various embodiments, for example, device 2200 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 22, device 2200 may include a housing with a front 2201 and a back 2202. Device 2200 includes a display 2204, an input/output (I/O) device 2206, camera 104, camera 105, infrared transmitter 204, and an integrated antenna 2208. Device 2200 also may include navigation features 2212. I/O device 2206 may include any suitable I/O device for entering information into a mobile computing device. Examples for I/O device 2206 may include an alphanumeric keyboard, a numeric keypad, a touch pad, input keys, buttons, switches, microphones, speakers, voice recognition device and software, and so forth. Information also may be entered into device 2200 by way of microphone (not shown), or may be digitized by a voice recognition device. As shown, device 2200 may include cameras 104, 105 and a flash 2210 integrated into back 2202 (or elsewhere) of device 2200. In other examples, cameras 104, 105 and flash 2210 may be integrated into front 2201 of device 2200 or both front and back sets of cameras may be provided. Cameras 104, 105 and a flash 2210 may be components of a camera module to originate image data with IR pattern or texture that may be processed into an image or streaming video that is output to display 2204 and/or communicated remotely from device 2200 via antenna 2208 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A stereoscopic imaging device comprising:
    a projector to project a pattern toward a scene;
    a lens moveably mounted in an optical path between the projector and the scene, wherein the lens comprises a wedge portion having a wedge angle and a planar portion or a second wedge portion, and wherein the lens being moveably mounted in the optical path comprises the wedge portion and the planar portion or the second wedge portion of the lens being moveable within the optical path; and
    a controller to provide a signal to move the wedge portion and the planar portion or the second wedge portion within the optical path at a rate synchronized to an image capture rate of the scene to provide only the wedge portion of the lens within the optical path during a first image capture and only the planar portion or the second wedge portion of the lens within the optical path during a second image capture.

2. The stereoscopic imaging device of claim 1, wherein the projector is an IR projector to project an IR pattern toward the scene and the wedge angle is not less than 0.25 degrees.

3. The stereoscopic imaging device of claim 1, wherein the lens comprises a lens disc and the lens being moveably mounted in the optical path comprises the lens disc being rotatably mounted substantially at a center point of the lens disc.

4. The stereoscopic imaging device of claim 3, further comprising a second lens disc rotatably mounted substantially at a center point of the second lens disc, wherein the second lens disc is independently moveable with respect to the lens disc.

5. The stereoscopic imaging device of claim 1, wherein the lens being moveably mounted in the optical path comprises the lens being linearly movable substantially orthogonal to the centerline of the optical path.

6. The stereoscopic imaging device of claim 1, wherein the wedge portion comprises a first flat surface and a second flat surface opposite the first flat surface and angled with respect to the first flat surface at the wedge angle.

7. The stereoscopic imaging device of claim 1, wherein the controller is to provide a second signal to move the wedge portion within the optical path during the first image capture to provide movement of a feature of the pattern during the first image capture.

8. The stereoscopic imaging device of claim 1, further comprising:
    first and second image capture devices to attain image data corresponding to the scene as illuminated by the IR pattern, wherein image capture by the first and second image capture devices is controlled via the controller.

9. At least one non-transitory machine readable medium comprising a plurality of instructions that, in response to being executed on a device, cause the device to perform stereoscopic imaging by:
    controlling an infrared (IR) projector to project a static IR pattern toward a scene;
    controlling a lens, the lens comprising a wedge portion having a wedge angle and a planar portion or a second wedge portion, moveably mounted in an IR path between the IR projector and the scene to move the wedge portion and the planar portion or the second wedge within the IR path, said controlling comprising providing a signal to move the wedge portion and the planar portion or the second wedge portion within the optical path at a rate synchronized to an image capture rate of the scene to provide only the wedge portion of the lens within the optical path during a first image capture and only the planar portion or the second wedge portion of the lens within the optical path during a second image capture; and capturing, via first and second image capture devices, image data corresponding to the scene as illuminated by the IR pattern during the first and second image captures.

10. The non-transitory machine readable medium of claim 9, wherein the lens comprises a lens disc and the lens being moveably mounted in the IR path comprises the lens disc being rotatably mounted substantially at a center point of the lens disc.

11. The non-transitory machine readable medium of claim 9, wherein controlling the lens further comprises providing a second signal to move the wedge portion within the optical path during the first image capture to provide feature movement during the first image capture.

12. The non-transitory machine readable medium of claim 9, wherein the lens being moveably mounted in the optical path comprises the lens being linearly movable substantially orthogonal to the centerline of the optical path.

13. The non-transitory machine readable medium of claim 9, wherein the wedge portion comprises a first flat surface and a second flat surface opposite the first flat surface and angled with respect to the first flat surface at the wedge angle, and wherein the wedge angle is not less than 0.25 degrees.

14. A stereoscopic imaging device comprising:
a projector to project a pattern toward a scene;
a lens disc moveably mounted, substantially at a center of the lens disc, to an axis that is outside of an optical path between the projector and the scene, wherein the lens disc is moveable about the axis such that, at any position of the lens disc about the axis, part of the lens disc is within the optical path and another pat of the lens disc is outside the optical path, and wherein the lens disc comprises a wedge portion having a wedge angle; and
a controller to provide a signal to move the lens disc within the optical path at a rate synchronized to an image capture rate of the scene to provide a first portion of the lens disc within the optical path during a first image capture and a second portion of the lens disc within the optical path during a second image capture.

15. The stereoscopic imaging device of claim 14, wherein the projector is an IR projector to project an IR pattern toward the scene and the wedge angle is not less than 0.25 degrees.

16. The stereoscopic imaging device of claim 14, further comprising a second lens disc rotatably mounted substantially at a center point of the second lens disc, wherein the second lens disc is independently moveable with respect to the lens disc.

17. The stereoscopic imaging device of claim 14, wherein the first portion comprises the wedge portion and the wedge portion is provided in the optical path during the first image capture but not during the second image capture.

18. The stereoscopic imaging device of claim 17, wherein a second wedge portion having a second wedge angle is also provided in the optical path during the first image capture.

19. The stereoscopic imaging device of claim 17, wherein the wedge portion comprises a flat surface and a curved surface opposite the flat surface and angled with respect to the flat surface at the wedge angle, and wherein the controller is to provide a second signal to move the wedge portion within the optical path during the first image capture of the scene to provide movement of a feature of the pattern during the image capture.

20. The stereoscopic imaging device of claim 14, further comprising:
first and second image capture devices to attain image data corresponding to the scene as illuminated by the IR pattern, wherein image capture by the first and second image capture devices is controlled via the controller.

* * * * *